United States Patent
Wang et al.

(10) Patent No.: US 9,448,016 B2
(45) Date of Patent: Sep. 20, 2016

(54) HEAT EXCHANGER AND BAFFLE THEREOF

(75) Inventors: Feng Wang, Zhejiang (CN); Jianlong Jiang, Zhejiang (CN); Linjie Huang, New York, NY (US)

(73) Assignee: SANHUA (HANGZHOU) MICRO CHANNEL HEAT EXCHANGER CO., LTD., Zhejiang (CN)

( * ) Notice: Subject to any disclaimer, the term of this patent is extended or adjusted under 35 U.S.C. 154(b) by 722 days.

(21) Appl. No.: 13/703,585

(22) PCT Filed: Jan. 11, 2011

(86) PCT No.: PCT/CN2011/070174
§ 371 (c)(1),
(2), (4) Date: Jan. 22, 2013

(87) PCT Pub. No.: WO2011/157063
PCT Pub. Date: Dec. 22, 2011

(65) Prior Publication Data
US 2013/0160981 A1    Jun. 27, 2013

(30) Foreign Application Priority Data
Jun. 13, 2010   (CN) .......................... 2010 1 0204935

(51) Int. Cl.
*F28F 9/22*   (2006.01)
*F28F 9/02*   (2006.01)
(Continued)

(52) U.S. Cl.
CPC .............. *F28F 9/0212* (2013.01); *F16L 41/00* (2013.01); *F28F 1/42* (2013.01); *F28F 9/0209* (2013.01);
(Continued)

(58) Field of Classification Search
CPC .... F28F 9/0209; F28F 9/0212; F28F 9/0246; F28F 9/0248; F28F 2009/226
USPC .................................................. 165/174, 178
See application file for complete search history.

(56) References Cited

U.S. PATENT DOCUMENTS 4,465,129 A * 8/1984 Baldensperger .... F28D 1/05383
165/173
5,097,900 A * 3/1992 Yamaguchi ......... F28D 1/05375
165/174

(Continued)

FOREIGN PATENT DOCUMENTS

CN           1611907 A        5/2005
CN       201196549 Y          2/2009
(Continued)

OTHER PUBLICATIONS

International Search Report dated Apr. 28, 2011 from corresponding PCT/CN2011/070174, pp. 6.

(Continued)

*Primary Examiner* — Leonard R Leo
(74) *Attorney, Agent, or Firm* — Ohlandt, Greeley, Ruggiero & Perle, LLP (57) ABSTRACT

A baffle and a heat exchanger with the baffle are provided. The baffle is disposed inside a header pipe of the heat exchanger, and divides the header pipe into two sections along the axial direction. The baffle supports a refrigerant duct which is set inside the header pipe along the axial direction. The baffle is a split type, and includes a first baffle member and a second baffle member connected together via an engagement structure. The installation efficiency of the baffle and the installation quality of the refrigerant duct are enhanced, and the reliability of the heat exchanger is also improved.

8 Claims, 8 Drawing Sheets

(51) Int. Cl.
*F16L 41/00* (2006.01)
*F28F 1/42* (2006.01)

(52) U.S. Cl.
CPC .......... *F28F 9/0246* (2013.01); *F28F 9/0248* (2013.01); *F28F 9/0273* (2013.01); *F28F 2009/226* (2013.01)

(56) References Cited

U.S. PATENT DOCUMENTS

| | | | |
|---|---|---|---|
| 5,123,483 A | 6/1992 | Tokutake et al. | |
| 5,183,107 A * | 2/1993 | Le Gauyer | F28F 9/0212 165/174 |
| 5,341,872 A * | 8/1994 | Mercurio | F28F 9/0212 165/174 |
| 5,400,853 A * | 3/1995 | Wolters | F28F 9/027 165/174 |
| 5,477,919 A | 12/1995 | Karube | |
| 5,526,876 A * | 6/1996 | Karube | F28F 9/0212 165/174 |
| 6,082,447 A * | 7/2000 | Insalaco | F28F 9/0212 165/174 |
| 6,729,386 B1 | 5/2004 | Sather | |
| 7,490,661 B2 * | 2/2009 | Nishino | F25B 39/028 165/174 |
| 7,516,779 B1 | 4/2009 | Marcus | |
| 7,654,108 B2 * | 2/2010 | Ishizaka | F28F 9/0246 165/174 |
| 8,661,845 B2 * | 3/2014 | Aung | F25B 39/02 165/174 |
| 2008/0023185 A1 * | 1/2008 | Beamer | F28F 9/0246 165/174 |

FOREIGN PATENT DOCUMENTS

| | | |
|---|---|---|
| CN | 101482346 A | 7/2009 |
| CN | 101520282 A | 9/2009 |
| CN | 101558277 A | 10/2009 |
| CN | 201697527 U | 1/2011 |
| CN | 101858705 A | 10/2012 |
| DE | 102006016839 A1 | 10/2009 |
| JP | 64067592 | 3/1989 |
| JP | 02293595 | 12/1990 |
| JP | 04254194 | 9/1992 |
| JP | 10047888 | 2/1998 |
| JP | 10217758 A | 8/1998 |
| JP | 2010065880 A | 3/2010 |

OTHER PUBLICATIONS

European Search Report dated Jan. 19, 2015, corresponding with European Application No. EP 11795029.5.

* cited by examiner

HEAT EXCHANGER AND BAFFLE THEREOF

CROSS-REFERENCED APPLICATIONS

The present application is the national phase of International Application No. PCT/CN2011/070174, titled HEAT EXCHANGER AND BAFFLE THEREOF", filed on Jan. 11, 2011, which claims the benefit of priority to Chinese patent application No. 201010204935.3 titled "HEAT EXCHANGER AND PARTITION THEREOF", filed with the Chinese State Intellectual Property Office on Jun. 13, 2010, the entire disclosure of which are incorporated herein by reference.

DISCLOSURE BACKGROUND

1. Field of the Disclosure

The present disclosure relates to a field of heat exchanging, especially to a partition for a heat exchanger, the present disclosure further relates to a heat exchanger having the aforementioned partition.

2. Discussion of the Background Art

A heat exchanger is a device for heat transfer between cold fluid and heat fluid, which is widely applied in the field of Heating Ventilation and Air Conditioning (HVAC) and so on.

Figure 1:
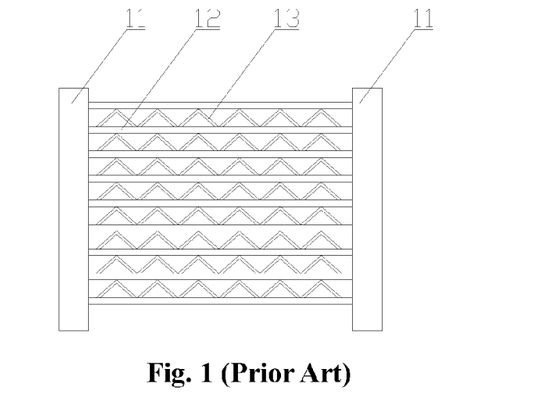
FIG. 1 is a structural schematic view of a typical heat exchanger in the prior art.
Figure 2:
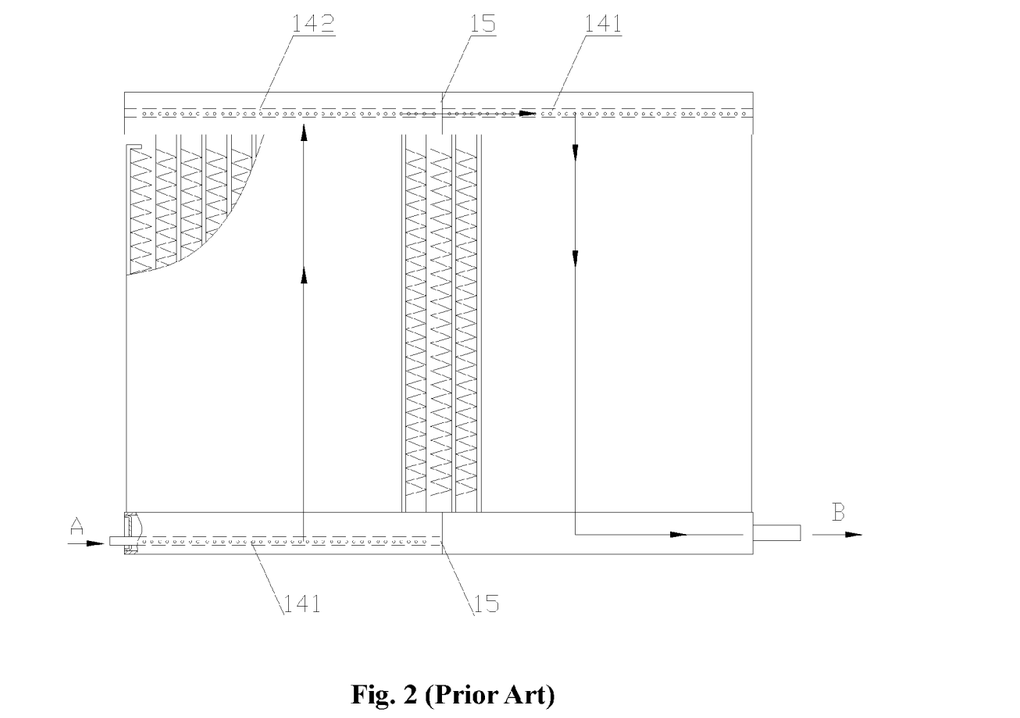
FIG. 2 is an internal structural schematic view of a typical heat exchanger in the prior art.

Referring to FIGS. 1 and 2, FIG. 1 is a structural schematic view of a typical heat exchanger in the prior art, and FIG. 2 is an internal structural schematic view of a typical heat exchanger in the prior art.

In the common evaporators and heat pumps, a typical heat exchanger includes two parallel manifolds 11 provided therebetween with a plurality of substantially parallel tubes 12. Corrugated fins 13 are provided between adjacent tubes 12. Both manifolds 11 are provided in corresponding pipe walls thereof with a plurality of tube receiving slots in longitudinal directions of the manifolds, and the tubes 12 are respectively inserted with both ends thereof in corresponding tube receiving slots in the manifolds 11 so that the two manifolds 11 are communicated with one another. Each manifold 11 is axially provided therein with a refrigerant pipe 14 which has a plurality of holes communicated with a cavity of the manifold 11, to convey refrigerant between the refrigerant pipe 14 and the cavity of the manifold 11. In a multi-flow evaporator, a heat pump or other applications, the manifold 11 is provided therein with a partition 15 so that the heat exchanger has a plurality of flow regions which are separate from and parallel with one another.

The direction indicated by the arrows in FIG. 2 indicates a direction in which the refrigerant flows. It can easily be seen from this figure, the partition 15 may be a plate allowing flow (for example the upper partition), or may be a plate completely preventing flow (for example the lower partition). The refrigerant pipe 14 may be classified into a distributing pipe 141 and a collecting pipe 142 according to its function, in which the distributing pipe 141 is used to uniformly mix a gas phase and a liquid phase of the refrigerant and to uniformly distribute the refrigerant to each tube 12, and the collecting pipe 142 is used to suck refrigerant from the manifold 11 and to redistribute refrigerant in the refrigerant pipe 14. As shown in FIG. 2, refrigerant flows into the distributing pipe 141 through a port A and flows into the upper manifold 11 through the tubes 12. The part of the refrigerant pipe 14 at a left side of the upper partition 15 functions as a collecting pipe 142, and refrigerant flows in the pipe in the direction indicated by the arrow to a right side of the partition 15 (at this time, the part of the refrigerant pipe 14 at the right side of the partition 15 functions as a distributing pipe 141), and then flows to a port B through the tubes 12. Obviously, when refrigerant flows into the heat exchanger through the port B and flows out of the heat exchanger through the port A, the functions of the distributing pipe 141 and the collecting pipe 142 shown in FIG. 2 are reversed.

Figure 3:
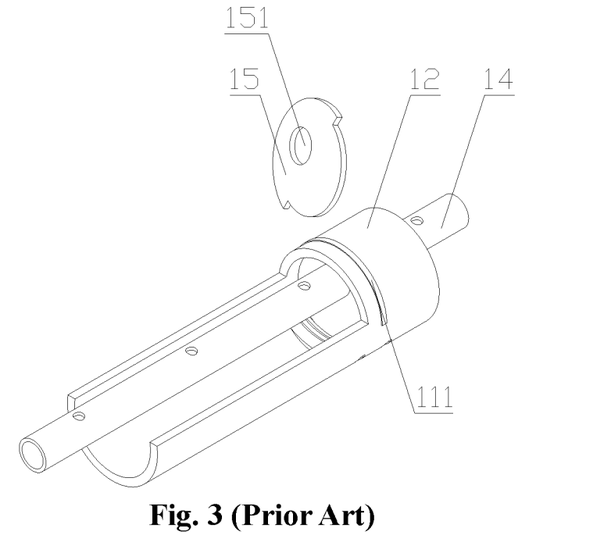
FIG. 3 is a schematic view of connection between a manifold and a refrigerant pipe in the heat exchanger shown in FIG. 2.

Referring to FIG. 3 which is a schematic view of the connection between the manifold and the refrigerant pipe in the heat exchanger shown in FIG. 2.

The manifold 11 is provided therein with a partition 15, and the partition 15 is provided therein with a mounting hole 151 through which the refrigerant pipe 14 can pass. At the same time, the manifold 11 is provided at a predetermined position of a side wall thereof with a segment of mounting groove 111 extending in a circumferential direction of the manifold. When assembling the heat exchanger, the partition 15 is radially inserted inside the manifold 11 through the mounting groove 111 with an edge portion of the partition 15 inserted inside the manifold 11 abuts against an inner wall of the manifold 11. Then the refrigerant pipe 14 is inserted in the mounting hole 151 in the partition 15 and is fixedly provided in the manifold 11 together with the partition 15. At last, the manifold 11, the partition 15 and the refrigerant pipe 14 are fixedly connected into one piece by brazing and so on.

When the manifold 11 and the refrigerant pipe 14 are long, the refrigerant pipe 14 has small rigidity and thus is easy to flex. If the mounting hole 151 in the partition 15 has a small size, after the partition 15 is assembled with the manifold 11, the refrigerant pipe 14 may unable to be inserted in the partition 15 because of the small gap between the partition 15 and the refrigerant pipe 14. However, if the gap is too large, the refrigerant pipe 14 may unable to be welded with the partition 15, which results in a leakage, and therefore the performance of the product is affected.

In addition, regarding the lower partition 15 in FIG. 2, in the prior art, one end of the refrigerant pipe 14 is plugged up and the other end thereof is fixed on an end cap so that the refrigerant pipe 14 forms a cantilever structure. When the heat exchanger is operated, the refrigerant pipe 14 would be vibrated, which would affect the service life of the product and also give rise to noise.

As a result, a technical problem to be solved by the person skilled in the art at present is to improve mounting quality of the refrigerant pipe and to enhance reliability of the heat exchanger.

SUMMARY OF THE DISCLOSURE

An object of the present disclosure is to provide a partition for a heat exchanger which can remarkably increase mounting quality of the refrigerant pipe of the heat exchanger, and can also improve reliability of the heat exchanger. Another object of the present disclosure is to provide a heat exchanger having the aforementioned partition.

In order to achieve the above object, the present disclosure provides a partition for a heat exchanger which is suitable to be provided in a manifold of the heat exchanger to axially partition the manifold and is suitable to support a refrigerant pipe axially provided in the manifold. The partition is of a split type and includes a first partition portion and a second partition portion, and the first partition portion is engaged with the second partition portion via an engaging structure.

Preferably, the first partition portion is formed therein with a mounting hole which is suitable to support the refrigerant pipe.

Preferably, the mounting hole is a through hole.

Preferably, the mounting hole is provided at a side thereof with a flanging.

Preferably, the partition further includes an inner bush provided in the mounting hole, and the flanging and the inner bush are made into one piece.

Preferably, the mounting hole is a blind hole.

Preferably, the engaging structure includes an engaging groove and an engaging protrusion matched with the engaging groove, wherein the engaging groove is formed in one of the first partition portion and the second partition portion, and the engaging protrusion is formed on the other of the first partition portion and the second partition portion.

Preferably, the engaging groove is formed in the first partition portion and the engaging protrusion is formed on the second partition portion.

Preferably, the engaging protrusion and the second partition portion are formed into one piece.

Preferably, the first partition portion includes an arc plate, a bottom plate and a side plate, wherein the bottom plate connects both ends of the arc plate, and the side plate is mounted at a side of the arc plate and bottom plate.

Preferably, the arc plate, the bottom plate and the side plate are made into one piece.

Preferably, the engaging groove is formed in the bottom plate and arc plate and extends upwardly a predetermined length from both ends of the arc plate.

Preferably, the engaging protrusion is formed thereon with a recess portion matched with an outer surface of the refrigerant pipe.

Preferably, the engaging groove is an engaging hole and the engaging protrusion is an engaging pin.

Preferably, the engaging groove divides the first partition portion into a first part and a second part, and the first part has a radial height larger than that of the second part.

Preferably, the partition includes two first partition portions and the second partition portion is inserted between the two first partition portions.

The present disclosure further provides a heat exchanger, including a first manifold; a second manifold; tubes, each tube being respectively connected at both ends thereof with the first manifold and the second manifold to communicate the first manifold with the second manifold; fins, each fin being provided between adjacent tubes respectively; a refrigerant pipe provided in at least one of the first manifold and the second manifold in an axial direction; and a partition provided in the at least one manifold to partition the at least one manifold and to support the refrigerant pipe, wherein the partition is any one of the above mentioned partitions.

Preferably, an outer edge of the second partition portion is flush with an outer edge of the at least one manifold. The partition for a heat exchanger according to the present disclosure is suitable to be provided in a manifold of the heat exchanger to axially partition the manifold and is suitable to support a refrigerant pipe axially provided in the manifold. Different from the prior art, the partition of the present disclosure is of a split type structure and includes a first partition portion and a second partition portion, and the first partition portion is engaged with the second partition portion via an engaging structure. That is, the first partition portion cooperates with the second partition portion to clamp the refrigerant pipe. In this way, the first partition portion may be cooperated and fixedly connected with the second partition portion at a proper position, which can achieve a partition function of the partition. At the same time, when assembling the heat exchanger, a part of the partition may firstly be surroundingly mounted on the refrigerant pipe and then is inserted into the manifold together with the refrigerant pipe. Then a relative position between the second partition portion and the first partition portion is adjusted so that the second partition portion is effectively cooperated with the first partition portion and finally achieve positioning function, which has a good positioning effect, a high mounting efficiency and is easy to carry out, and thus can effectively increase the assembling efficiency of the heat exchanger and reduce the assembling cost thereof.

It can easily be seen from the above processes, since the refrigerant pipe may be assembled with a part of the partition outside the manifold, the assembling difficulty between the refrigerant pipe and the partition is remarkably reduced and the assembling efficiency can be increased. Further, a size of a hole or a through groove in the partition in which the refrigerant pipe is inserted may be controlled properly as required, which remarkably reduces a possibility that the refrigerant pipe cannot be inserted in the partition and also remarkably reduces a possibility that the partition cannot be welded with the refrigerant pipe and thus gives rise to a leakage. Thereby the reliability of the heat exchanger is remarkably increased.

Based on the above partition, the present disclosure further provides a heat exchanger having the above partition. Since the partition has the above advantageous effects, the heat exchanger having the above partition also has the same technical effects

DETAILED DESCRIPTION OF THE PREFERRED EMBODIMENT

A spirit of the present disclosure is to provide a partition for a heat exchanger which can remarkably improve the mounting quality of the refrigerant pipe of the heat exchanger, and can also improve the reliability of the heat exchanger. Another spirit of the present disclosure is to provide a heat exchanger having the aforementioned partition.

In order that the person skilled in the art could better understand the solutions of the present disclosure, herein, taking the case in which both the manifold and the refrigerant pipe are circular pipes as an example, the present disclosure is described in detail with reference to the accompany drawings and the specific embodiments. It should be understood that, the manifold and the refrigerant pipe may include, but is not limited to, circular pipes, and structures having other shapes such as rectangle can also meet the requirement of the present disclosure.

Figure 4:
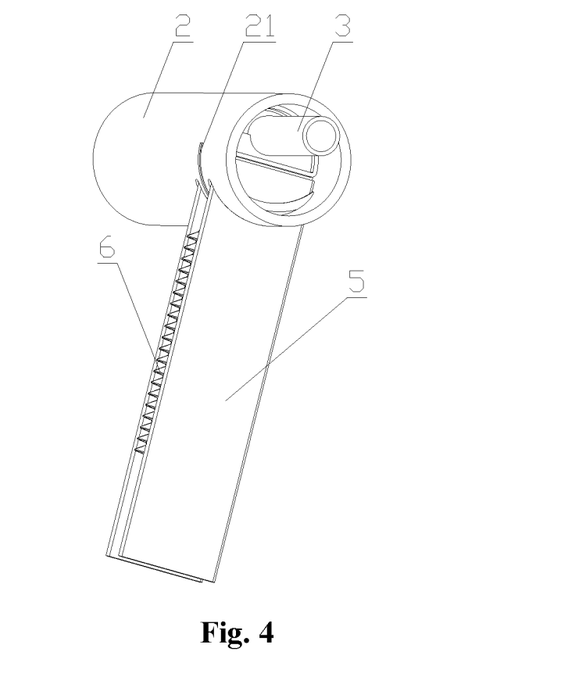
FIG. 4 is a partial structural schematic view of a first specific embodiment of a heat exchanger according to the present disclosure.

Referring to FIG. 4, which is a partial structural schematic view of a first specific embodiment of a heat exchanger according to the present disclosure.

The heat exchanger according to the present disclosure includes a manifold 2, a refrigerant pipe 3 and a partition 4. The refrigerant pipe 3 extends in an axial direction of the manifold 2, and the partition 4 surrounds the refrigerant pipe 3 and is used to connect the refrigerant pipe 3 and the manifold 2, and divides the manifold 2 into two parts in an axial direction so that the heat exchanger can have at least two separate flow regions. The differences between the present disclosure and the prior art are that, the partition 4 according to the present disclosure includes a first partition portion 41 and a second partition portion 42, the first partition portion 41 is engaged with the second partition portion 42 via an engaging structure, and the first partition portion 41 cooperates with the second partition portion 42 to clamp the refrigerant pipe 3.

A sum of a radial height of the first partition portion 41 and a radial height of the second partition portion 42 may be equal to or larger than an inner diameter of the manifold 2. In this way, the first partition portion 41 may be cooperated with the second partition portion 42 at a proper position, and the first partition portion 41 may be fixedly connected with the second partition portion by brazing and so on so as to achieve a partition function of the partition 4.

At the same time, when assembling the heat exchanger, when a sum of a depth that a tube 5 is inserted in the manifold 2 and the radial height of the first partition portion 41 is smaller than or equal to the inner diameter of the manifold 2, the first partition portion 41 may pass through the manifold 2 under an action of an external force. Thus, the refrigerant pipe 3 and the first partition portion 41 may be assembled after the tubes 5, fins 6, the manifolds 2 and the second partition portion 42 are substantively assembled. That is, the first partition portion 41 is firstly surroundingly mounted on the refrigerant pipe 3 and then is inserted into the manifold 2 together with the refrigerant pipe. Then, the second partition portion 42 is partially drawn out, and the position of the first partition portion 41 is adjusted properly so that the second partition portion 42 is effectively cooperated with the first partition portion 41 and finally position the first partition portion 41, which has a good positioning effect, a high assembling efficiency, and is easy to carry out, and thus can effectively increase the assembling efficiency of the heat exchanger and reduce the assembling cost thereof.

It can easily be seen from the above processes, since the refrigerant pipe 3 may be assembled with the first partition portion 41 outside the manifold 2, not only the assembling efficiency can be increased but also a size of a hole or a through groove in the first partition portion 41 in which the refrigerant pipe 3 is inserted can be controlled properly as required, which remarkably reduces a possibility that the refrigerant pipe 3 cannot be inserted in the partition 4 and also considerably reduces a possibility that the partition 4 cannot be welded with the refrigerant pipe 3 and thus gives rise to a leakage. Thereby the reliability of the heat exchanger is considerably increased.

In particular, the above partition 4 may extend in a radial direction of the manifold 2 so that the inner space of the manifold 2 may be divided into at least two flow regions which are parallel with each other.

It is to be noted that, the orientation expressions such as upper, lower, top end and so on recited in the text are defined based on the posture of the heat exchanger shown in FIG. 3. In this figure, a direction above the tube 5 is defined as upper, and a direction opposing to the upper direction is defined as lower. It should be noted that the orientation expressions employed herein should not limit the protection scope of the present disclosure.

Figure 5:
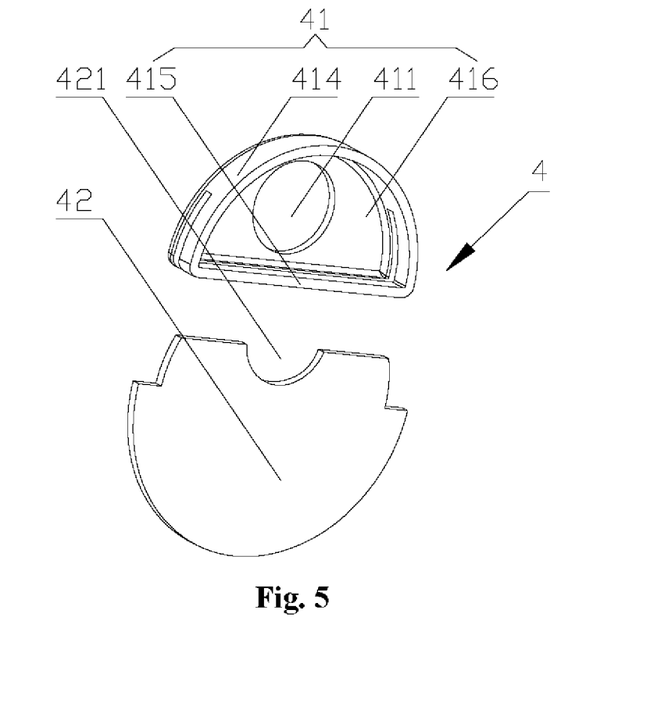
FIG. 5 is a structural schematic view of a first specific embodiment of the partition according to the present disclosure.
Figure 6:
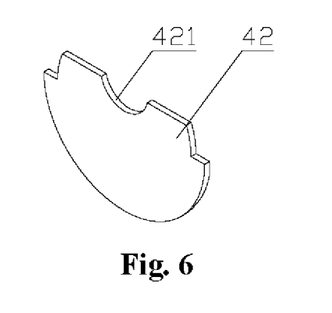
FIG. 6 is a structural schematic view of a first specific embodiment of a second partition portion according to the present disclosure.
Figure 7:
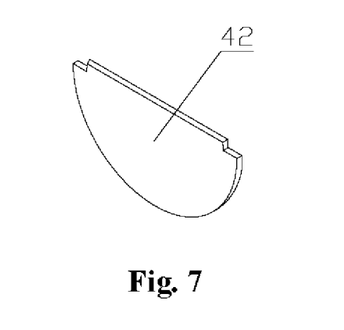
FIG. 7 is a structural schematic view of a second specific embodiment of the second partition portion according to the present disclosure.

Referring to FIGS. 5 to 7, in which FIG. 5 is a structural schematic view of a first specific embodiment of the partition according to the present disclosure, FIG. 6 is a structural schematic view of a first specific embodiment of a second partition portion according to the present disclosure, and FIG. 7 is a structural schematic view of a second specific embodiment of the second partition portion according to the present disclosure.

In a specific embodiment, the engaging structure may include an engaging groove 43 and an engaging protrusion cooperated with the engaging groove 43. The engaging groove 43 is provided in one of the first partition portion 41 and the second partition portion 42, and the engaging protrusion is provided on the other one of the first partition portion 41 and the second partition portion 42. In addition, the first partition portion 41 may have a mounting hole 411, and the refrigerant pipe 3 is inserted in the mounting hole 411 and is connected with the first partition portion 41. As shown in FIG. 5, the first partition portion 41 may include an arc plate 414, a bottom plate 415 and a side plate 416, among which, the bottom plate 415 connects both ends of the arc plate 414, and the side plate 416 provided therein with the mounting hole 411 is mounted at a side of the arc plate 414 and bottom plate 415. Obviously, the arc plate 414, the bottom plate 415 and the side plate 416 may be formed separately or integrally. The engaging groove 43 is formed in the bottom plate 415 and arc plate 414 and extends upwardly a predetermined length from both ends of the arc plate 414.

Further, the engaging protrusion on the second partition portion 42 may have a recess portion 421 cooperated with a lower surface of the refrigerant pipe 3. As shown in FIG. 3, the refrigerant pipe 3 is inserted in the mounting hole 411 in the first partition portion 41 with the lower surface of the refrigerant pipe being located in the recess portion 421 in the second partition portion 42, so that the first partition portion 41 is fixedly connected with the second partition portion 42 into one piece.

Obviously, the first partition portion 41 may also have a connecting groove in which the refrigerant pipe 3 can be inserted, and the connecting groove cooperates with the recess portion 421 in the second partition portion 42 so as to fix the refrigerant pipe 3 between the first partition portion 41 and the second partition portion 42, which kind of structure can also meet the requirement of the present disclosure. At the same time, if the first partition portion 41 has a mounting hole 411 and the second partition portion 42 is not provided at a top end thereof with the recess portion 421, instead, the top end of the second partition portion 42 is flat, the object of the present disclosure may also be achieved as long as the second partition portion 42 can be connected with the first partition portion 41. That is, it can meet the requirement of the present disclosure as long as the first partition portion 41 can be cooperated with the second partition portion 42 so as to fix the refrigerant pipe 3, which structure should fall into the protection scope of the present disclosure.

In order to provide a good partition effect, the person skilled in the art should reach a conclusion that, the partition 4 can achieve an optimal partition function if both the mounting hole 411 and the recess portion 421 have sizes slightly larger than that of the refrigerant pipe 3. It is obvious that, considering the convenience of assembling and errors that may be caused in manufacturing or machining, the fact that both the mounting hole 411 and the recess portion 421 have sizes slightly larger than that of the refrigerant pipe 3 is just to ensure that the partition 4 can closely surround the periphery of the refrigerant pipe 3.

Besides, the first partition portion 41 has a size equal to an inner size of the manifold 2, a part of the second partition portion 42 provided inside the manifold 2 has a size equal to the inner size of the manifold 2, that is, after the first partition portion 41 is mounted inside the manifold 2, an outer edge of the first partition portion 41 can just abut against an inner wall of the manifold 2, and is snugly fit with the inner wall of the manifold 2 so that the manifold 2 is divided into two separate flow regions.

At the same time, since a wall of the manifold 2 has a certain thickness, and after the second partition portion 42 is inserted into the manifold 2 from a notch 21 in the manifold 2 and is mounted in the manifold 2, the notch 21 needs to be plugged up. Therefore, after the second partition portion 42 is mounted, one part thereof is located inside the manifold 2 and the other part thereof is used to plug up the notch 21 in the manifold 2, and the part of the second partition portion 42 inside the manifold 2 has a size equal to the inner size of the manifold 2 so that an inner space of the manifold 2 is divided into two parts after the first partition portion 41 is assembled and cooperated with the second partition portion 42.

In particular, the second partition portion 42 may has an outer diameter exactly equal to that of the manifold 2, that is an outer edge of the second partition portion 42 is flush with the outer wall of the manifold 2 after the second partition portion 42 is completely mounted, to increase the aesthetic sensibility of the outer wall of the manifold 2. At the same time, the manifold 2 may be provided with two or more partitions 4 in an axial direction of the manifold according to a heat exchanging requirement of the heat exchanger, so that the manifold 2 is axially divided into two or more heat exchanging spaces.

Obviously, the above sizes are all optimal sizes, and it also should fall into the protection scope of the present disclosure if there is an error which can be compensated in a subsequent process.

Several specific embodiments of the first partition portion 41 and the second partition portion 42 are given hereinafter to describe various detailed structures of the partition 4 in the heat exchanger according to the present disclosure. Of course, the partition 4 according to the present disclosure includes, but is not limited to, the embodiments described hereinafter.

Figure 8:
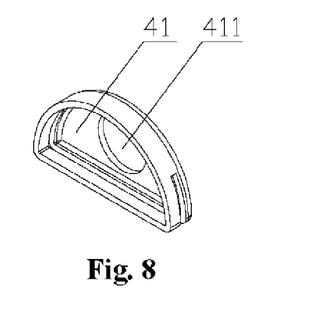
FIG. 8 is a perspective structural schematic view of a first specific embodiment of the first partition portion according to the present disclosure.
Figure 9:
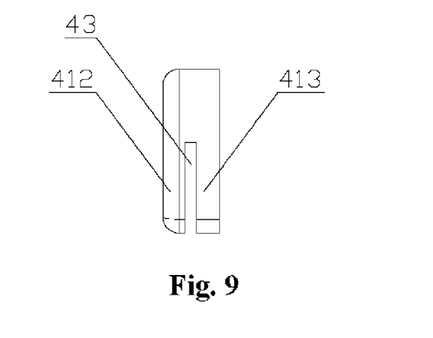
FIG. 9 is a side view of the first partition portion shown in FIG. 8.
Figure 10:
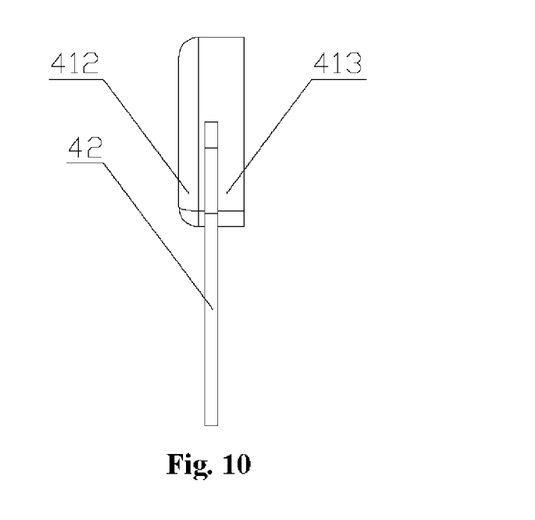
FIG. 10 is a structural schematic view showing the cooperation between the first partition portion shown in FIG. 8 and the second partition portion.

Referring to FIGS. 8 to 10, among which FIG. 8 is a perspective structural schematic view of a first specific embodiment of the first partition portion according to the present disclosure, FIG. 9 is a side view of the first partition portion shown in FIG. 8 and FIG. 10 is a structural schematic view showing the cooperation between the first partition portion shown in FIG. 8 and the second partition portion.

In the first embodiment, the engaging groove 43 is provide in the first partition portion 41, and the engaging protrusion is provided on the second partition portion 42 and may be made into one piece with the second partition portion 42. As shown in the figures, the engaging groove 43 divides the first partition portion 41 into a first part 412 and a second part 413, and the first part 412 and the second part 413 have the same radial height. When mounting the partition, the refrigerant pipe 3 is assembled with the first partition portion 41 outside the manifold 2, and the second partition portion 42 is inserted between the first part 412 and the second part 413 through the notch 21. Then the first partition portion 41 and the second partition portion 42 are connected integrally with the refrigerant pipe 3 and the manifold 2 by brazing and so on.

Obviously, the engaging groove 43 may be provided in the second partition portion 42 and the first partition portion 41 is provided with the mounting hole 411. The second partition portion 42 is provided with the engaging groove 43 so that the first partition portion 41 is caught in the engaging groove 43, which kind of structure should be deemed to an equivalent structure shown in the figures.

Figure 11:
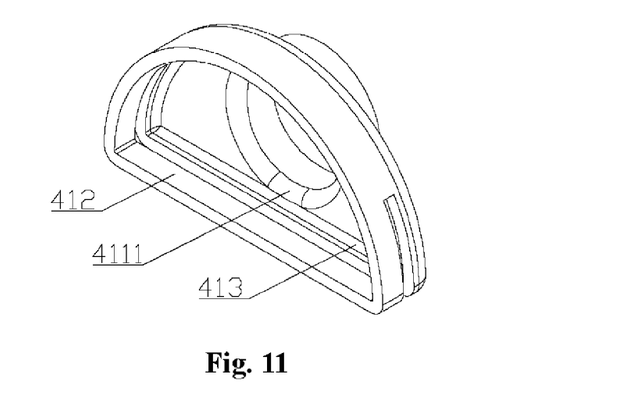
FIG. 11 is a structural schematic view of a second specific embodiment of the first partition portion according to the present disclosure.
Figure 12:
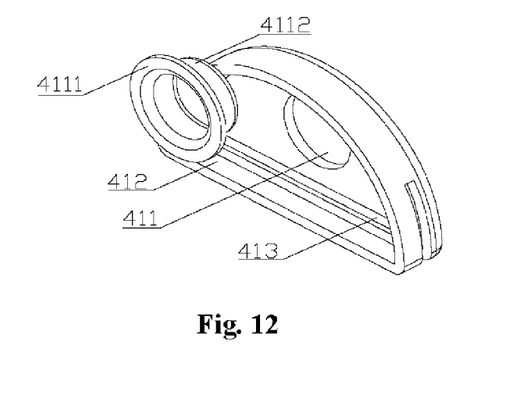
FIG. 12 is a structural schematic view of a third specific embodiment of the first partition portion according to the present disclosure.
Figure 13:
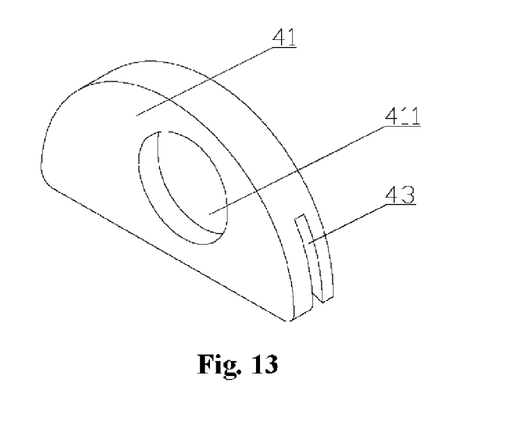
FIG. 13 is a structural schematic view of a fourth specific embodiment of the first partition portion according to the present disclosure.

Referring to FIGS. 11 to 13, among which FIG. 11 is a structural schematic view of a second specific embodiment of the first partition portion according to the present disclosure, FIG. 12 is a structural schematic view of a third specific embodiment of the first partition portion according to the present disclosure and FIG. 13 is a structural schematic view of a fourth specific embodiment of the first partition portion according to the present disclosure.

Further, the mounting hole 411 may be provided at a side thereof with a flanging 4111, that is the refrigerant pipe 3 is inserted in the mounting hole 411 along the flanging 4111 at this side. The flanging 4111 increases a contact area between the refrigerant pipe 3 and the first partition portion 41 to facilitate the mounting of the refrigerant pipe. In addition, the mounting hole 411 may be provided therein with an inner bush 4112, the flanging 4111 may be fixedly connected with the inner bush 4112 or may be made into one piece, so that the refrigerant pipe 3 is mounted in the inner bush 4112.

In addition, the first partition portion 41 according to the present disclosure may either be formed by pressing (as shown in FIGS. 10 and 11) or be formed by machining (as shown in FIG. 12). The first partition portion 41 shown in FIG. 12 is produced by machining a thick sheet material, which has a large weight but is easy to machine. However, the first partition portion 41 shown in FIGS. 10 and 11 can be made to be lighter so as to save raw material for a final product.

Figure 14:
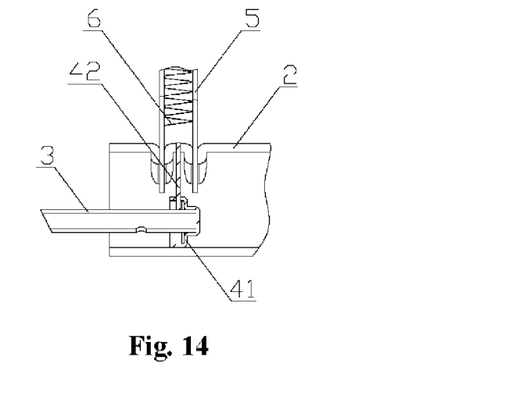
FIG. 14 is a partial exploded schematic view of a second specific embodiment of the heat exchanger according to the present disclosure.
Figure 15:
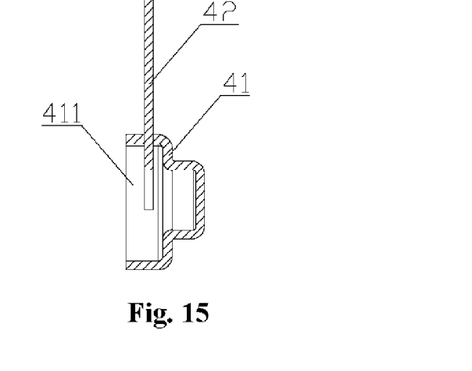
FIG. 15 is a structural schematic view showing the cooperation between the first partition portion and the second partition portion in the heat exchanger shown in FIG. 14.
Figure 16:
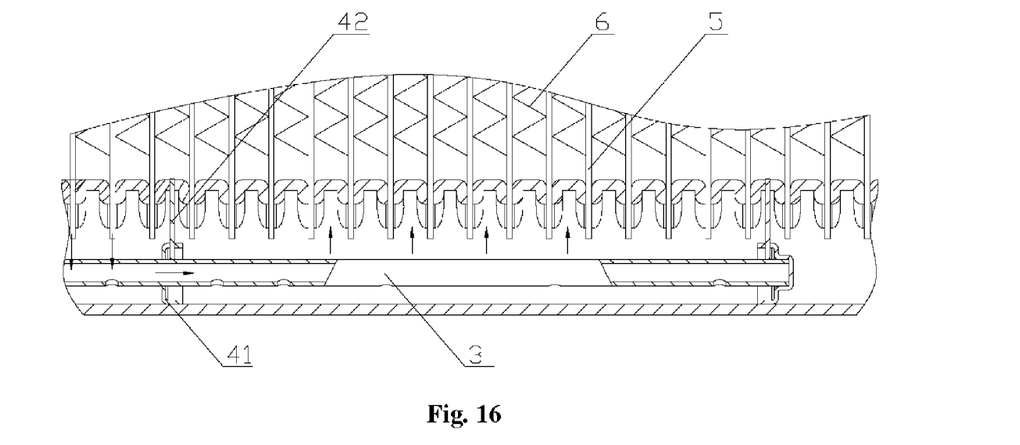
FIG. 16 is a partial structural schematic view of a third specific embodiment of the heat exchanger according to the present disclosure.

Referring to FIGS. 14 to 16, among which FIG. 14 is a partial exploded schematic view of a second specific embodiment of the heat exchanger according to the present disclosure, FIG. 15 is a structural schematic view showing the cooperation between the first partition portion and the second partition portion in the heat exchanger shown in FIG. 14 and FIG. 16 is a partial structural schematic view of a third specific embodiment of the heat exchanger according to the present disclosure.

As shown in FIG. 16, the mounting hole 411 may be a through hole or may be a blind hole. When the mounting hole 411 is a through hole, the partition 4 divides the refrigerant pipe 3 into two parts, one part of the refrigerant pipe 3 at one side of the partition 4 is a distributing pipe and the other part of the refrigerant pipe 3 at the other side of the partition 4 is a collecting pipe. When the mounting hole 411 is a blind hole, the pipe at a side of the partition 4 is either a distributing pipe or a collecting pipe.

When the mounting hole 411 is a blind hole, it means that both ends of the refrigerant pipe 3 are fixed and does not form a cantilever structure. When the heat exchanger is operated, the possibility that the refrigerant pipe 3 may be vibrated and the amplitude thereof are both reduced significantly, and thus the noise is effectively reduced and the service lift of the heat exchanger is prolonged.

Figure 17:
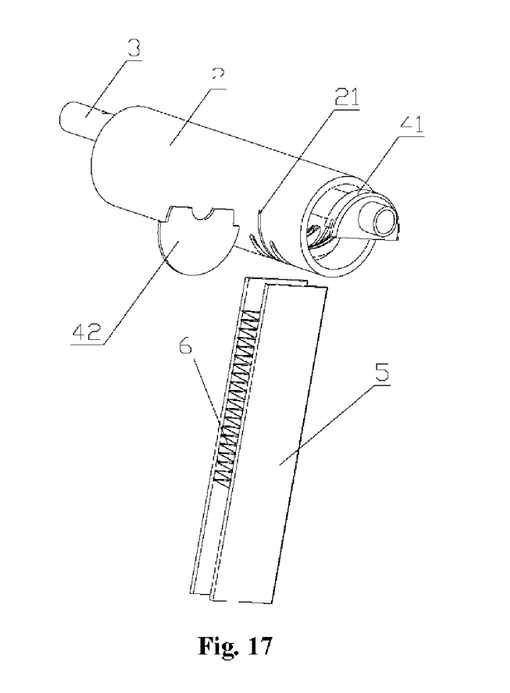
FIG. 17 is a partial exploded schematic view of a fourth specific embodiment of the heat exchanger according to the present disclosure.
Figure 18:
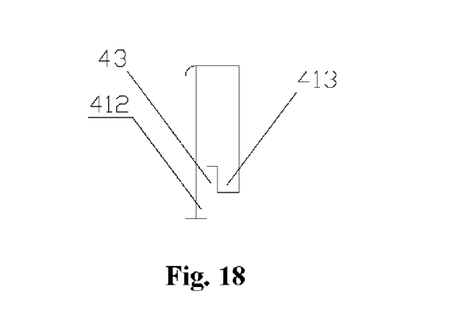
FIG. 18 is a side view of a sixth specific embodiment of the first partition portion according to the present disclosure.
Figure 19:
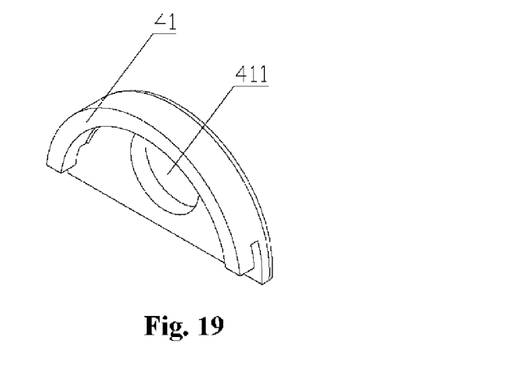
FIG. 19 is a perspective structural schematic view of the first partition portion shown in FIG. 18.

Referring to FIGS. 17 to 19, among which FIG. 17 is a partial exploded schematic view of a fourth specific embodiment of the heat exchanger according to the present disclosure, FIG. 18 is a side view of a sixth specific embodiment of the first partition portion according to the present disclosure and FIG. 19 is a perspective structural schematic view of the first partition portion shown in FIG. 18.

In the sixth embodiment, the above first part 412 has a radial height larger than that of the second part 413. When the second partition portion 42 is brought to contact with the first partition portion 41, a depth of the second partition portion 42 that is inserted in the manifold 2 may be adjusted so that the second partition portion 42 overlaps with the first partition portion 41. Then the second partition portion 42 is slid into the engaging groove 43 along the second part 413 with a smaller radial height, which facilitates the positioning and assembling of the second partition portion 42 during the mounting process, and thus leads to a better positioning effect. Thereby the mounting difficulty of the partition 4 is further reduced and the reliability of the heat exchanger is increased.

Furthermore, the second part 413 with smaller height may be provided at a side adjacent to the engaging groove 43 with a chamfer to guide the second partition portion 42 to slide into the engaging groove 43, thus further increases the mounting efficiency of the partition 4.

Figure 20:
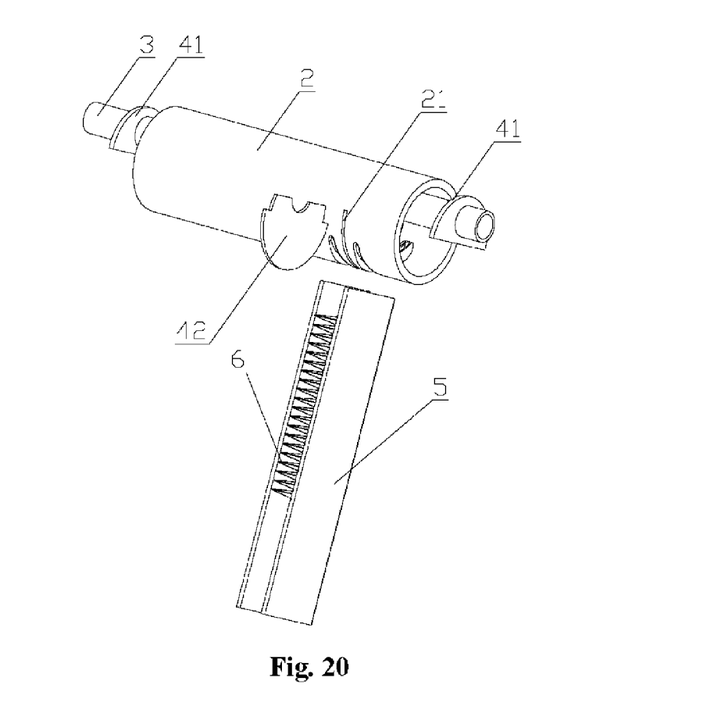
FIG. 20 is a partial exploded schematic view of a fifth specific embodiment of the heat exchanger according to the present disclosure.
Figure 21:
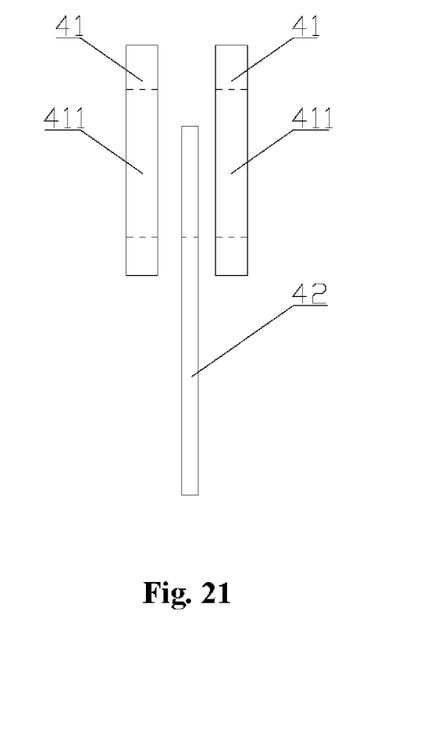
FIG. 21 is a side view of a partition in the heat exchanger shown in FIG. 20.

Referring to FIGS. 20 and 21, in which FIG. 20 is a partial exploded schematic view of a fifth specific embodiment of the heat exchanger according to the present disclosure and FIG. 21 is a side view of a partition in the heat exchanger shown in FIG. 20.

In each of the above first and second embodiments, the partition 4 has only one first partition portion 41 and the engaging groove 43 is provided in the first partition portion 41. In the third embodiment, the partition 4 may have two first partition portions 41 and the second partition portion 42 is inserted between the two first partition portions 41. That is, the second partition portion 42 is provided at both sides thereof with a first partition portion 41 respectively so that the engaging groove 43 receiving the second partition portion 42 is defined by spacing between the two first partition portions 41. In this way, a contact area between first partition portions 41 and the second partition portion 42 can be increased, the first partition portions 41 and the second partition portion 42 can be better sealed therebetween after they are welded, the structure is more robust and the reliability of the heat exchanger is higher.

In addition, in the partition according to the present disclosure, the engaging groove 43 may be an engaging hole and the engaging protrusion may be an engaging pin cooperated with the engaging hole. That is, the first partition portion 41 may be provided at a lower portion thereof with one of the engaging hole and the engaging pin, and the second partition portion 42 may be provided at an upper portion thereof with the other of the engaging hole and the engaging pin. The first partition portion 41 and the second partition portion 42 are connected as a whole via the engaging hole and the engaging pin. The cooperation between the hole and the pin will not be described in detail since it is common in the art.

In conclusion, the first partition portion 41 may be connected with the second partition portion 42 in a way that one of the first partition portion 41 and the second partition portion 42 is inserted in the other or in a way that one of the first partition portion 41 and the second partition portion 42 overlaps with the other. The refrigerant pipe 3 may be fixedly connected with the first partition portion 41 or with the second partition portion 42, and the refrigerant pipe 3 can also be fixedly connected through an engaging hole formed by cooperation of the first partition portion 41 with the second partition portion 42. At the same time, if the first partition portion 41 is fixedly connected with the second partition portion 42 via the engaging groove 43, the engaging groove 43 may be provided in the first partition portion 41 or the second partition portion 42, and the engaging groove 43 can be formed by two first partition portions 41 or two second partition portions 42.

Based on the above partition, the present disclosure further provide a heat exchanger which includes a first manifold, a second manifold, tubes 5 and fins 6. Among which, each tube 5 is connected at both ends thereof with the first manifold and the second manifold, so that the first manifold is communicated with the second manifold. Adjacent tubes 5 are provided therebetween with fins 6, and at least one of the first manifold and the second manifold is provided therein with the refrigerant pipe 3, and at least one of them is provided therein with the above partition 4 which partitions the first manifold and/or the second manifold and supports the refrigerant pipe 3.

In particular, an outer edge of the second partition portion 42 is flush with an outer edge of the first manifold and/or the second manifold, which makes the heat exchanger more of aesthetic sensibility.

A heat exchanger and a partition thereof according to the present disclosure are described in detail in the above description. Specific examples are employed herein to describe the principle of the present disclosure and the embodiments thereof, and the descriptions of the above embodiments are only used to help those skilled in the art to understand a method of the present disclosure and a spirit thereof. It should be noted that, those skilled in the art can also make many improvements and modifications without departing from the principle of the disclosure, and these improvements and modifications should also be deemed to fall into the protection scope of the disclosure.

What is claimed is:

1. A partition for a heat exchanger, the partition being suitable to be provided in a manifold of the heat exchanger to axially partition the manifold and being suitable to support a refrigerant pipe axially provided in the manifold, characterized in that, the partition is of a split type and comprises a first partition portion and a second partition portion, and the first partition portion is engaged with the second partition portion via an engaging structure; wherein the first partition portion is formed therein with a mounting hole which is suitable to support the refrigerant pipe, the mounting hole is a through hole, and the mounting hole is provided at a side thereof with a flanging;

wherein the engaging structure comprises an engaging groove and an engaging protrusion matched with the engaging groove;

wherein the engaging groove is formed in the first partition portion and the engaging protrusion is formed on the second partition portion;

wherein the first partition portion comprises an arc plate, a bottom plate and a side plate, the bottom plate connects both ends of the arc plate, and the side plate is mounted at a side of the arc plate and bottom plate; and wherein the engaging groove is formed in the bottom plate and arc plate and extends upwardly a predetermined length from both ends of the arc plate.

2. The partition for a heat exchanger according to claim 1, wherein the partition further comprises an inner bush provided in the mounting hole, and the flanging and the inner bush are made into one piece.

3. The partition for a heat exchanger according to claim 1, wherein the engaging protrusion and the second partition portion are formed into one piece.

4. The partition for a heat exchanger according to claim 1, wherein the arc plate, the bottom plate and the side plate are made into one piece.

5. The partition for a heat exchanger according to claim 1, wherein the engaging protrusion is formed thereon with a recess portion matched with an outer surface of the refrigerant pipe.

6. The partition for a heat exchanger according to claim 1, wherein the engaging groove is an engaging hole and the engaging protrusion is an engaging pin.

7. A heat exchanger, characterized by comprising:
a first manifold;
a second manifold;
tubes, each tube being respectively connected at both ends thereof with the first manifold and the second manifold to communicate the first manifold with the second manifold;
fins, each fin being provided between adjacent tubes respectively;
a refrigerant pipe provided in at least one of the first manifold and the second manifold in an axial direction; and
a partition provided in the at least one manifold to partition the at least one manifold and to support the refrigerant pipe, wherein the partition is the partition according to claim 1.

8. The heat exchanger according to claim 7, wherein an outer edge of the second partition portion is flush with an outer edge of the at least one manifold.

* * * * *

UNITED STATES PATENT AND TRADEMARK OFFICE
CERTIFICATE OF CORRECTION

| | | |
|---|---|---|
| PATENT NO. | : 9,448,016 B2 | |
| APPLICATION NO. | : 13/703585 | |
| DATED | : September 20, 2016 | |
| INVENTOR(S) | : Feng Wang et al. | |

It is certified that error appears in the above-identified patent and that said Letters Patent is hereby corrected as shown below:

In the Drawings

Please replace drawing sheets 1 of 8 and 7 of 8 with the replacement sheets included herewith.

Signed and Sealed this
Second Day of May, 2017

Michelle K. Lee
*Director of the United States Patent and Trademark Office*